United States Patent
Thomas (10) Patent No.: US 9,791,053 B2
(45) Date of Patent: Oct. 17, 2017

(54) BALL VALVE WITH OFFSET STRAIGHT THROUGH FLOW

(75) Inventor: Kurt R. Thomas, Durand, IL (US)

(73) Assignee: Schneider Electric Buildings, LLC, Andover, MA (US)

( * ) Notice: Subject to any disclaimer, the term of this patent is extended or adjusted under 35 U.S.C. 154(b) by 1487 days.

(21) Appl. No.: 13/172,078

(22) Filed: Jun. 29, 2011

(65) Prior Publication Data

US 2013/0001455 A1    Jan. 3, 2013

(51) Int. Cl.
*F16K 5/00* (2006.01)
*F16K 5/06* (2006.01)

(52) U.S. Cl.
CPC ................... *F16K 5/0605* (2013.01)

(58) Field of Classification Search
USPC .............. 137/834; 251/315.01, 315.16
See application file for complete search history.

(56) References Cited

U.S. PATENT DOCUMENTS

| | | | |
|---|---|---|---|
| 3,475,003 A * | 10/1969 | Paluszek | 251/163 |
| 4,103,868 A * | 8/1978 | Thompson | 251/283 |
| 4,881,718 A | 11/1989 | Champagne | |
| 4,993,453 A * | 2/1991 | McHugh | 137/559 |
| 5,324,008 A | 6/1994 | Bonetti | |
| 6,899,128 B2 * | 5/2005 | Oh | 137/556 |

FOREIGN PATENT DOCUMENTS

| | | |
|---|---|---|
| CN | 2071731 U | 2/1991 |
| CN | 101243274 A | 8/2008 |
| CN | 101421548 A | 4/2009 |
| EP | 0570049 A1 | 11/1993 |
| JP | 2000046209 A | 2/2000 |
| KR | 20070119343 A | 12/2007 |
| WO | WO 2007/118666 A1 | 10/2007 |

* cited by examiner

*Primary Examiner* — R. K. Arundale
(74) *Attorney, Agent, or Firm* — Reinhart Boerner Van Deuren P.C.

(57) ABSTRACT

A ball valve with offset straight through flow is provided. The ball valve has a housing having an inlet and an outlet and an internal cavity. A non-spherical ball valve member is positioned within the internal cavity. The valve member is mechanically coupled to a valve stem extending from the internal cavity to an exterior of the housing such that rotation of the valve stem results in a like rotation of the valve member. The ball valve has a fully closed position wherein fluid flow therethrough is prevented. The ball valve member also has a fully opened position where fluid flow therethrough is allowed. The ball valve can transition from the fully closed position to the frilly opened position and vice versa with a rotation of the valve member of less than or equal to about forty-five degrees.

9 Claims, 7 Drawing Sheets

BALL VALVE WITH OFFSET STRAIGHT THROUGH FLOW

FIELD OF THE INVENTION

This invention generally relates to valve technology, and more particularly to ball valves and their associated valve members.

BACKGROUND OF THE INVENTION

Ball valves are generally known in the art and used in a variety of applications ranging from liquid to gas flow control. A typical ball valve includes a housing, also often referred to as a valve body, that has an internal cavity and an inlet and an outlet in fluid communication with the internal cavity. A flow path extends from the inlet, through the cavity, and through the outlet.

A spherical valve member is positioned in the flow path within the internal cavity of the housing. The valve member has a passageway extending entirely through the center of the valve member. A variety of seals can be employed within the internal cavity and adjacent the valve member to restrict flow through the passageway of the valve member, and prevent fluid from freely flowing around the valve member that would otherwise cause leakage.

The passageway through the valve member is selectively alignable with the flow path extending through the housing. A stem extends through the wall of the housing and is mechanically coupled to the valve member such that rotation of the stem results in a like rotation in the valve member. As such the valve member within the housing is selectively alignable with the flow path via rotation of the valve stem from outside of the housing.

Partial or complete alignment of the passageway with the flow path will allow fluid to flow from the inlet to the outlet of the housing. When this is so, the valve is said to be in a partial or fully open position, respectively. Complete misalignment of the passageway with the flow path will prevent fluid to flow from the inlet to the outlet. When this is so, the valve is said to be in a closed position. As such, the range of positions of a typical ball valve are often categorized as fully open, partially open, or fully closed.

BRIEF SUMMARY OF THE INVENTION

With the above description of a typical ball valve in hand, several problems arise from the same. As indicated above, the valve member is typically spherical in shape. The passageway therethrough typically has a circular cross section and passes through a center of the valve member. Such a configuration requires the valve member to have an increased wall thickness surrounding the passageway in order to handle the stresses of high pressure applications. Accordingly, the size of the passageway in addition to the size of the increased wall thickness of the valve member results in a relatively large valve member. As a result, a relatively large housing is required to carry the valve member. Such a configuration is often times undesirable in small operating space environments.

The aforementioned size constraints of a typical ball valve can also lead to higher power requirements to actuate the valve. Indeed, many ball valve applications are actuated using an electrically powered actuator coupled to the stem of the ball valve. These actuators are specified in large extent based on the actuation force required to transition the valve from fully open to fully closed. As a result, the relatively large size of a typical spherical ball valve member drives up the size and power requirements of such actuators, and thus increases the cost of procurement and operation of the ball valve.

Furthermore, in contemporary applications, the passageway of the valve member typically extends through the center thereof. As a result, a typical spherical valve member must rotate approximately ninety degrees to transition a valve incorporating the same from fully opened to fully closed. Such a requirement also disadvantageously increases the power requirements to actuate the valve.

In light of the above, there is a need in the art for a ball valve that incorporates a valve member that is reduced in size and requires less power to operate than its contemporary counter parts.

The invention provides such a ball valve. These and other advantages of the invention, as well as additional inventive features, will be apparent from the description of the invention provided herein.

In one aspect, embodiments of the invention provide a ball valve with a lightweight construction that consumes less power during actuation thereof than prior designs. An embodiment of a ball valve according to this aspect has a fully open position to allow fluid flow through the ball valve, and a fully closed position to prevent fluid flow through the ball valve. Such a ball valve includes a housing having an inlet and an outlet and an internal cavity positioned between the inlet and the outlet. A flow path extends through the housing and between the inlet and the outlet. The ball valve also includes a non-spherical valve member positioned within the cavity and within the flow path. The valve member has a passageway therethrough that is selectably alignable with the flow path. The non-spherical valve member is rotatable within the internal cavity to transition the ball valve between the fully opened position and the fully closed position and vice versa.

In certain embodiments, the ball valve also includes a valve stem extending through the housing from an exterior thereof. The valve stem is coupled to the valve member such that rotation of the valve stem results in a like rotation of the valve member to transition the ball valve between the fully opened position and the fully closed position.

In certain embodiments, the non-spherical valve member has a hemispherical head portion and a ring-shaped neck portion extending outwardly from the hemispherical head portion. The passageway of the valve member defines a valve member flow axis passing through the center of the passageway. The valve member flow axis passes only through the ring portion of the valve member.

In certain embodiments, a rotation of the valve member of less than or equal to about forty-five degrees transitions the ball valve between the fully opened position and the fully closed position and vice versa. In certain embodiments, the hemispherical head portion has a first width. The ring-shaped neck portion has a second width. The first width is greater than the second width. The hemispherical head portion has a third width measured perpendicular to the first width. The ring-shaped neck portion has a fourth width measured perpendicular to the second width. The third width is greater than the fourth width.

In certain embodiments, the ball valve further comprises an inlet seal positioned adjacent the inlet and having an annular inlet seal surface that sealingly engages the valve member. The ball valve also includes an outlet seal positioned adjacent to the outlet and having an annular outlet seal surface that sealingly engages the valve member. The hemispherical head portion contacts the annular inlet sealing surface and the annular outlet sealing surface in the fully closed position. The ring-shaped neck portion only contacts the annular outlet sealing surface in the fully closed position.

In certain embodiments, the valve member has a first partially hemispherical portion disposed on one side of an axis passing through a center of the valve member, and a second partially hemispherical portion disposed on another side of the axis. In certain embodiments, an inlet pockets and an outlet pockets extend radially inward into each of the partially hemispherical portions. The first and second pockets are symmetric about an origin of the valve member located at the geometrical center thereof.

In certain embodiments, an inlet seal is positioned adjacent the inlet and has an annular inlet seal surface that sealingly engages the valve member. An outlet seal is positioned adjacent the outlet and has an annular outlet seal surface that sealing engages the valve member. The first partially hemispherical portion contacts the annular inlet seal surface and the annular outlet seal surface in the fully opened position, and only contacts the amular outlet seal surface in the fully closed position. The second partially hemispherical portion contacts the annular inlet seal surface and the annular outlet seal surface in the fully opened position, and only contacts the annular inlet seal surface in the fully closed position.

In another aspect, embodiments of the present invention provide a ball valve having a reduced overall size as a result of a compact valve member associated therewith. An embodiment of a ball valve according to this aspect has a fully opened position to allow fluid flow through the ball valve, and a fully closed position to prevent fluid flow through the ball valve. The ball valve includes a housing having an inlet and an outlet and a flow path extending therebetween. A valve member is positioned within an internal cavity of the housing between the inlet and the outlet and within the flow path to selectively transition the ball valve between the fully opened and fully closed positions. The valve member has a straight passageway. The passageway has a non-circular cross sectional profile and defines a valve member flow axis passing through a center of the passageway.

In certain embodiments, the ball valve further includes a valve stem extending from an exterior of the housing and into an internal cavity thereof. The valve stem is mechanically coupled to the valve member such that rotation of the valve stem about a valve stem axis passing through a center of the valve stem results in a like rotation of the valve member. The ball valve transitions from the fully opened to the fully closed position and vice versa upon rotation of the valve stem and corresponding rotation of the valve member of less than or equal to about forty-five degrees.

In certain embodiments, the constant cross-sectional profile is non-circular. In certain embodiments, the straight passageway has a convex portion and at least one concave portion. In certain embodiments, the straight passageway has a convex portion and first and second concave portions. The first concave portion begins at a first end of the convex portion. The second concave portion begins at a second end of the convex portion. Each of the first and second concave portions have a free end. A third concave portion extends between the free ends of the first and second concave portions.

In certain embodiments, a radius of curvature of each of the first and second concave portions is less than a radius of curvature of the third concave portions. In certain embodiments, a radius of curvature of each of the first and second concave portions is less than a radius of curvature of the third concave portion. In certain embodiments, the radius of curvature of the first concave portion is equal to the radius of curvature of the second concave portion.

In yet another aspect, embodiments of the invention provide a ball valve requiring a reduced amount of actuation power to transition the ball valve to fully opened to frilly closed and vice versa. A ball valve according to this embodiment includes a housing having an inlet and an outlet and an internal cavity positioned between the inlet and outlet. A flow path extends through the housing and between the inlet and the outlet. A valve member is positioned within the internal cavity and rotatable therein such that rotation of the valve member of less than or equal to about forty-five degrees transitions the ball valve from the fully opened position to the fully closed position and vice versa.

In certain embodiments, the valve member includes a head portion and ring-shaped neck portion extending away from the head portion. In certain embodiments, the valve member includes a passageway extending through the ring-shaped neck portion. In certain embodiments, the passageway defines a valve member flow axis. The valve member has a center axis passing through a center thereof. The valve member flow axis is parallel to and offset from the valve member center axis.

In certain embodiments, the valve member has a first partially hemispherical portion disposed on one side of an axis passing through a center of the valve member, and a second partially hemispherical portion disposed on another side of the axis.

An inlet side pocket and an outlet side pocket extend radially inward into each of the partially hemispherical portions. The first and second pockets are symmetric about an origin of the valve member located at the geometrical center thereof. The valve member has a flow path axis passing through a center of the valve member.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
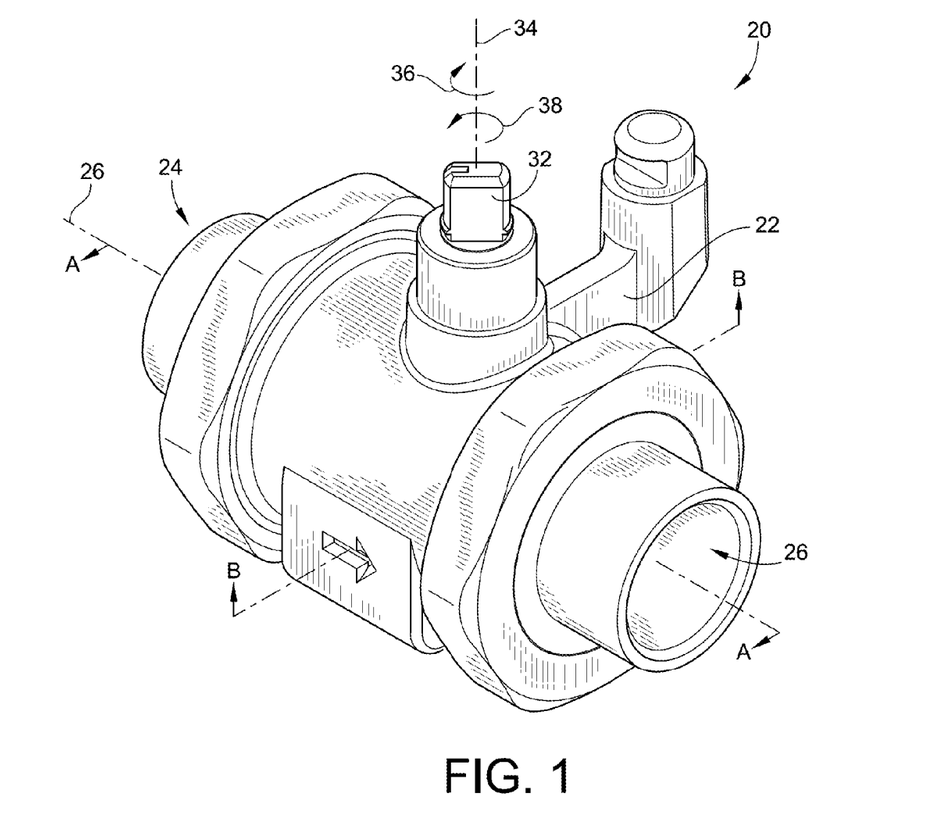
FIG. 1 is a perspective view of an embodiment of a ball valve according to the teachings of the present invention.

Turning now to the drawings, there is illustrated in FIG. 1 an exemplary embodiment of a ball valve 20 according to the teachings of the present invention. The ball valve 20 includes a housing 22. The housing 22 has an inlet 24 and an outlet 26 axially aligned with the inlet 24 along a flow path represented by a flow path axis 28. The flow path axis 28 extends through the ball valve 20 and generally represents the course of fluid flow from the inlet 24 to and through the outlet 26. As used herein, the term "fluid" contemplates liquids, gases, liquid-gas mixtures, and slurries. Indeed, it will be recognized by those skilled in the art that the ball valve 20 is not limited in its application to any particular type of fluid.

A valve stem 32 of the ball valve 20 extends from an exterior of the housing 22 into an internal cavity 50 (see FIG. 2) of the housing 22. The valve stem 32 is rotatable about a valve stem axis 34 in first and second rotational directions 36, 38 to selectively open and close the ball valve 20.

Figure 2:
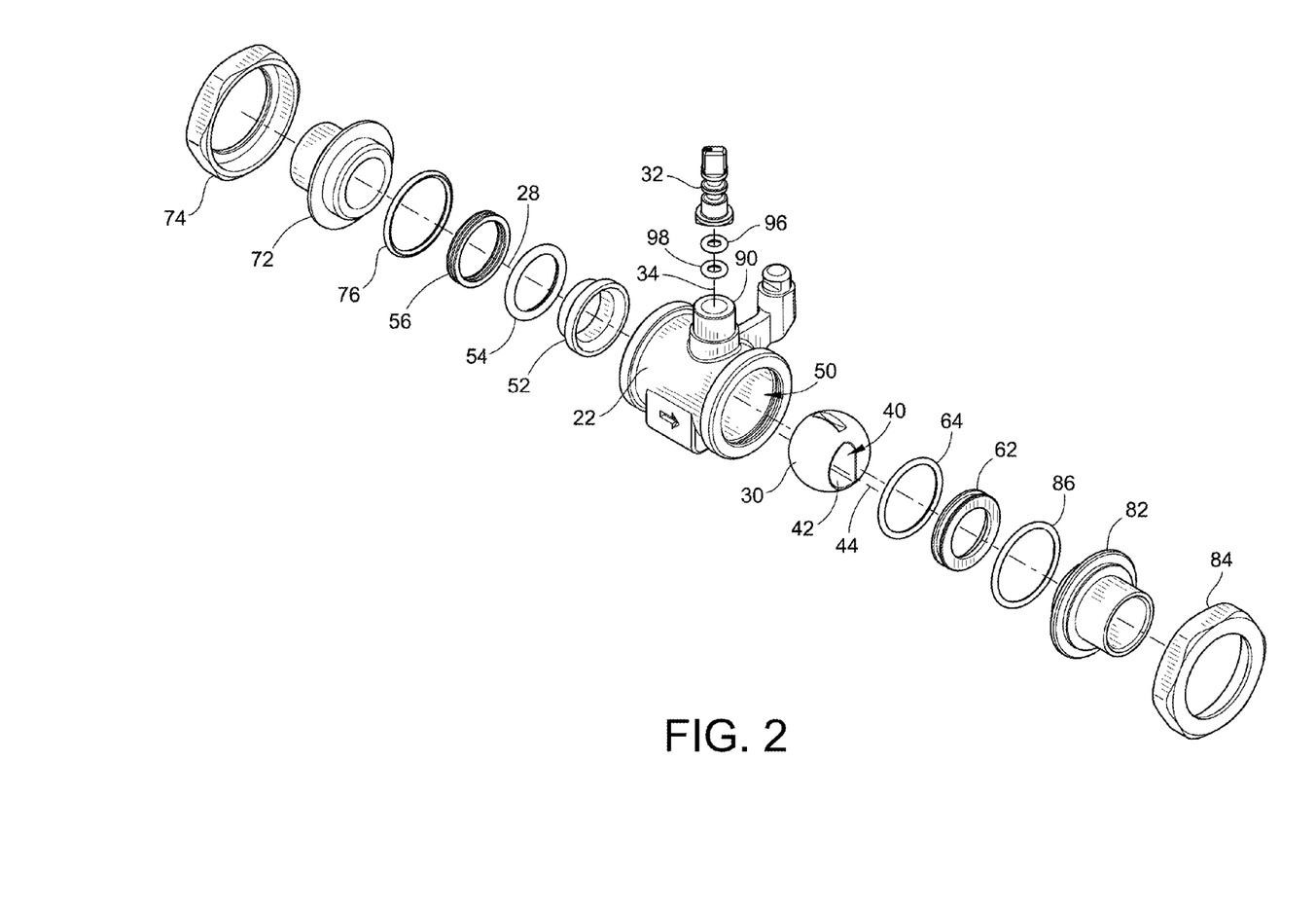
FIG. 2 is a perspective exploded view of the ball valve of FIG. 1.

More specifically, the valve stem 32 extends through the housing 22 and is mechanically coupled to a valve member 30 (see FIG. 2). The valve stem 32 is coupled to the valve member 30 such that rotation of the valve stem 32 in either of the first or second rotational directions 36, 38 results in a like rotation of the valve member 30. The aforementioned rotation is imparted to the valve stem 32 to transition the ball valve 20 between a fully opened position and a fully closed position and vise versa. As used herein, the phrase "fully opened" defines an orientation of the valve member 30 (see FIG. 2) that permits the maximum flow of fluid through the ball valve 20. Also as used herein, the phrase "fully closed" defines an orientation of the valve member 30 (see FIG. 2) that prevents any flow of fluid through the ball valve 20. Also as used herein, the phrase "partially opened" defines an orientation that of the valve member 30 (see FIG. 2) between the fully opened positioned and fully closed position that permits at least some fluid flow through the ball valve 20.

The housing 22 incorporates a mounting structure 46 to mount an actuator (not shown) to the ball valve 20. The actuator mechanically connects to the valve stem 30 to provide the rotation about the valve stem axis 34 in either of the first or second rotational directions 36, 38. Alternatively, the ball valve 20 can include a lever or other structure connected to the valve stem 32 for hand manipulation of the valve stem 20.

As will be explained in greater detail below, the ball valve 20 presents improvements over prior designs by reducing the power required to actuate the ball valve 20 between the fully opened and fully closed position and vice versa. The ball valve 20 also improves on prior designs by presenting a smaller and more lightweight configuration. The aforementioned advantages are achieved, in part, by the inclusion of a non-spherically shaped valve member 30 (see FIG. 2) that utilizes an offset passageway 40 (see FIG. 2) therethrough. Such a configuration reduces the power required to actuate the ball valve 20 as well as reduces the amount of rotation of the valve stem 32 and valve member 30 required to transition the ball valve 20 between the fully opened and fully closed positions.

Turning now to FIG. 2, the ball valve 20 is illustrated in an exploded state to introduce the various components thereof. The valve member 30 is received within an internal cavity 50 of the housing 22. As illustrated, the valve member 30 is in the orientation required to place the ball valve 20 in the fully opened position. The offset passageway 40 defines a valve member flow axis 44 through the valve member 30. As can be seen in FIG. 2, the valve member flow axis 44 is offset and parallel to a valve member center axis 104 (see FIG. 3), and offset and parallel to the flow path axis 28.

The valve member 30 and more particularly the passageway 40 thereof, presents a straight and smooth passageway 40 to fluid flowing through the valve member 30. It will be recognized that such a configuration reduces the overall turbulence of the ball valve 20 as well as the pressure drop across the ball valve 20. This straight and uninterrupted configuration of the passageway 40 can also be described in terms of the cross sectional profile of the passageway 40. That is, the cross sectional profile of the passage way 40 remains unchanged throughout the valve member 30. The cross sectional is thus the same as the profile of the orifice(s) 42 at the terminal ends of the passageway 40.

A pair of seal arrangements are disposed on either side of the valve member 30 within the internal cavity 50 of the housing 22. More specifically, an inlet seal ring 52 is positioned on an inlet side of the valve member 30. A compliant seal 54 is carried by the inlet seal ring 52, and is positioned between the inlet seal ring 52 and an internal surface of the housing 22 which bounds the internal cavity 50.

A biasing element 56 biases the inlet seal ring 52 as well as the seal 54 carried thereby. The biasing element 56 acts upon the inlet seal ring 52 in such a way as to bias a sealing surface thereof into sealing engagement with the valve member 30. This configuration restricts fluid flow through the passageway 40 of the valve member 30 as opposed to around the valve member 30 from the inlet to the outlet of the housing 22 (see FIG. 1). It will be recognized by those skilled in the art that the biasing element 56 can take a variety of forms and is not limited to the particular structure shown at FIG. 2. Indeed, the biasing element 56 may be a wave spring, or a plurality of independent springs each acting upon the inlet seal ring 52 and seal 54, etc. Similarly, the seal 54 is not limited to the particular structure illustrated in FIG. 2. Indeed, the seal 54 can be supplied as a standard O-ring made from any material commonly recognized in such application.

An inlet end fitting 72 is positioned upstream along the flow path axis 28 from the biasing element 56. The inlet end fitting 72 is fastened to the housing 22 using a hex nut 74. The hex nut 74 and inlet end fitting 72 are preferably removable from the housing 22 to allow the ball valve 20 to accommodate various styles of connections such as brazing, soldering, welding, and/or threaded engagement, etc. Further, the inlet end fitting 72 can be made out of a plastic material, for coupling to plastic piping systems such as PVC systems. A seal 76 is positioned between the inlet end fitting 72 and the inner surface of the housing 22 which bounds the internal cavity 50. The seal 76 restricts fluid flow along the flow path axis 28 through the orifice of the inlet end fitting 72 as opposed to circumventing the same. The inlet end fitting 72 can incorporate various end geometries such as threads, keying arrangements, seals, etc., depending upon the desired connection style used to connect piping to the ball valve 20. That is, various end fittings can be used, and the particular inlet end fitting 72 (as well as the outlet end fitting 82 described below) illustrated are not limiting on the invention in any way.

An outlet seal ring 62 is positioned on an outlet side of the valve member 30 within the internal cavity 50. Similar to the inlet seal ring 52, the outlet seal ring 62 carries a seal 64 which sealing engages the internal surface the housing 22 which bounds the internal cavity 50. This configuration restricts fluid flow through the passageway 40 to the outlet 26 (see FIG. 1) in the event the inlet side seal 54 has failed and fluid has circumvented the inlet seal ring 52 and valve member 30. It will be recognized that the seal 64 also prevents back flow leakage from the outlet 26 to the inlet 24 (see FIG. 1). Although the outlet seal ring 62 and outlet seal 64 are not biased against valve member 30 by way of a biasing element, it will be recognized that such a configuration could be incorporated to sealingly bias the outlet seal ring 62 into engagement with valve member 30. Such a configuration could be incorporated in addition to the inlet side biasing element 56 or in the alternative.

Positioned downstream from the outlet seal ring 62 is an outlet end fitting 82 of the same or similar design as the inlet end fitting 72. The outlet end fitting 82 is fastened to the housing 22 by way of a hex nut 84. A seal 86 is positioned between the outlet end fitting 82 and the inner surface of the housing 22 which bounds the internal cavity 50. The seal 86 between the outlet end fitting 82 and the housing 22 achieves the same or similar advantages as the seal 76 positioned between the inlet end fitting 72 and the housing 22 described above. Further, the outlet end fitting 82 and hex nut 84 are also preferable removable from the housing 22 receive different end fittings to accommodate various connection styles with the ball valve 20.

Figure 3:
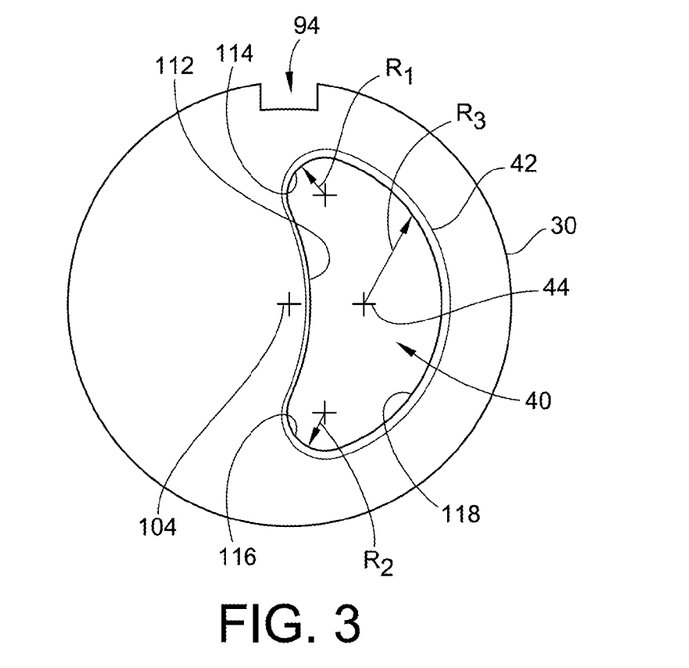
FIG. 3 is a front view of valve member of the ball valve of FIG. 1.
Figure 4:
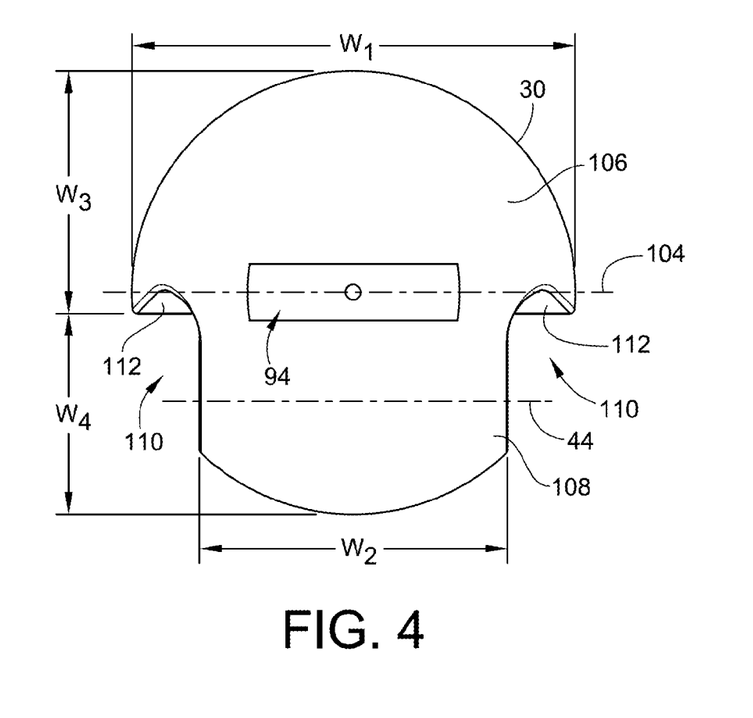
FIG. 4 is a top view of the valve member of FIG. 3.

Turning now to FIGS. 3 and 4, the particular shape of the illustrated embodiment of the valve member 30 will be described in greater detail. With particular reference to FIG. 3, the valve member 30 is shown such that the valve member flow axis 44 and valve member center axis 104 extend generally perpendicular to and out of the page. As can be seen in FIG. 3, the passageway 40, and more particularly the valve member flow axis 44 passing through the geometrical centroid of the passageway 40 is parallel and offset from the valve member axis 104 which passes through the center of the valve member 30. The passageway 40 is straight through the valve member 30 such that it is free from any substantial interruptions or substantial bends and has a generally constant cross sectional profile throughout the valve member 30 that is the same as the shape of the orifice 42 at the terminal ends of the passageway 40.

The passageway 40 can also be described in terms of the shape of the orifices 42 and the resultant surface contours that extend between the orifices 42 as a result of the constant cross sectional profile of the passageway 40. As illustrated, the orifice 42 has a convex portion 112. A first concave portion 114 having a radius of curvature $R_1$ extends from an edge of the convex portion 112. Likewise, a second concave portion 116 extends from the other edge of the convex portion 112 and has a second radius of curvature $R_2$. As can be seen at FIG. 3, the first and second radii of curvature $R_1$, $R_2$ are the same.

A third concave portion 118 extends between the edges of the first and second concave portions 114, 116 that do not meet with and extend from the first convex portion 112. The third concave portion 118 has a radius of curvature $R_3$. As can be seen at FIG. 3, the third radius of curvature $R_3$ is greater than the first and second radii of curvature $R_1$, $R_2$. As noted above, the cross sectional profile of the passageway 40 is constant, and as such, the same is bounded by a convex surface, and first, second, and third concave surfaces that respectively extend from the convex portion 112, and first second, and third concave portions 114, 116, 118 and between the orifices 42 of the passageway.

The above offset configuration and shape of the passage way 40 facilitates a decreased amount of rotation of the valve member 30 required to transition the ball valve 20 (see FIG. 1) between the fully opened and fully closed positions and vice versa. However, it will be recognized that the particular shape of the constant cross sectional profile of the passageway 40 can be modified to other geometries and still achieve the advantages herein.

With reference now to FIG. 4, the valve member 30 is shown in a top view. As can be seen in FIG. 4, the non-spherical shape of the valve member 30 is evident. The valve member 30 has a hemispherical head portion 106. A ring-shaped neck portion 108 extends radially outward from the hemispherical head portion 106. The phrases "hemispherical" and "ring-shaped" as used herein are used for purposes of general description and thus it will be recognized that the head portion 106 is not restricted to an exact hemisphere, nor is the ring-shaped neck portion 108 restricted to exactly a ring shape.

The hemispherical head portion 106 has a first width $W_1$. The ring-shaped neck portion has a second width $W_2$, which is less than the width $W_1$ of the hemispherical head portion 106. The hemispherical head portion 106 also has a width $W_3$ taken perpendicular to the width $W_1$ thereof. Similarly, the ring-shaped neck portion 108 has a width $W_4$ taken perpendicular to the width $W_2$ thereof. As can be seen at FIG. 4, width $W_3$ is generally greater than width $W_4$.

As a result, the outer periphery of the valve member 30 has voids or pockets 110 positioned on either side of the ring-shaped neck portion 108 to achieve the aforementioned width differentials between the hemispherical head portion 106 and ring-shaped neck portion 108. Additionally, the outer periphery of the valve member also includes a key way 94 for receipt of a key 92 (see FIG. 5) of the valve stem 30 to achieve the aforementioned mechanical connection between the valve stem 32 and valve member 30. Although the key way 94 is illustrated as generally rectangular in shape, it will be immediately recognized that various other geometries could be readily incorporated into the outer periphery of the valve member 30 to achieve such a keyed relationship.

Figure 5:
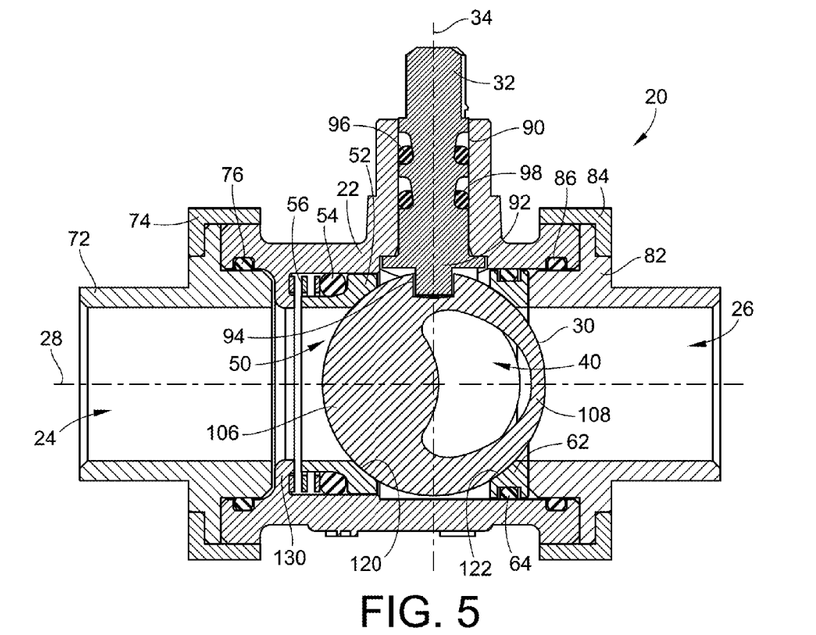
FIG. 5 is a side cross section taken along section line A-A of FIG. 1 illustrating the valve member of FIGS. 3 and 4 positioned within a housing of the ball valve of FIG. 1, with the valve member positioned such that the ball valve is in a fully closed position.
Figure 6:
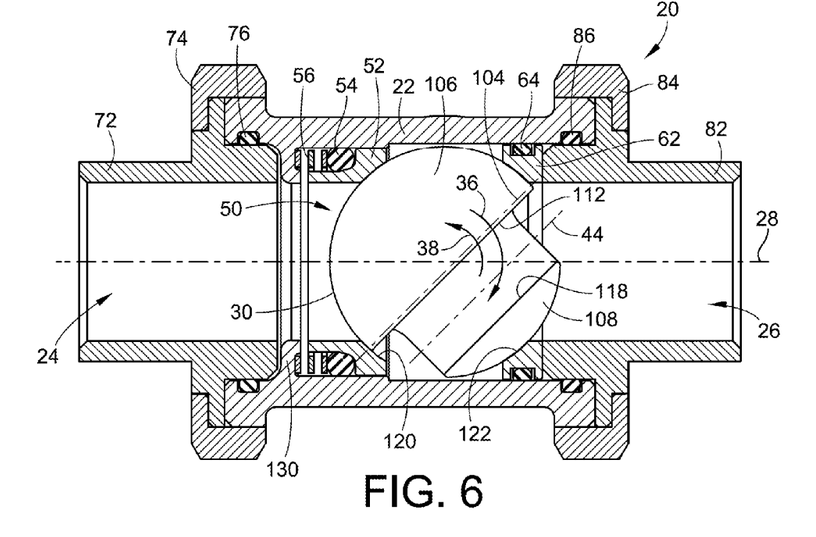
FIG. 6 is a top cross section taken along section line B-B of FIG. 1 illustrating the valve member of FIGS. 3 and 4 positioned within a housing of the ball valve of FIG. 1, with the valve member positioned such that the ball valve is in a fully closed position.
Figure 7:
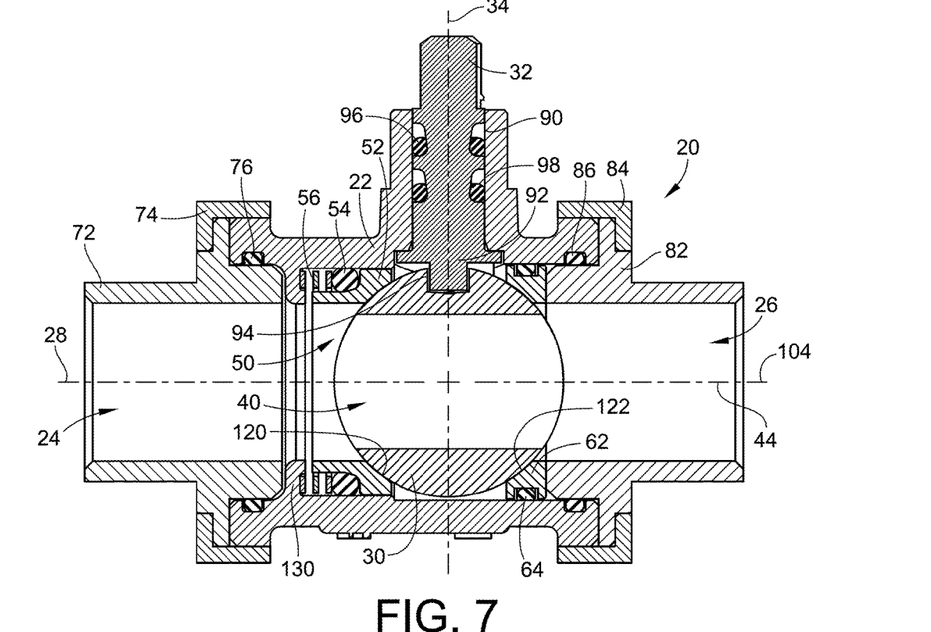
FIG. 7 is a side cross section taken along section line A-A of FIG. 1 illustrating the valve member of FIGS. 3 and 4 positioned within a housing of the ball valve of FIG. 1, with the valve member positioned such that the ball valve is in a fully opened position.
Figure 8:
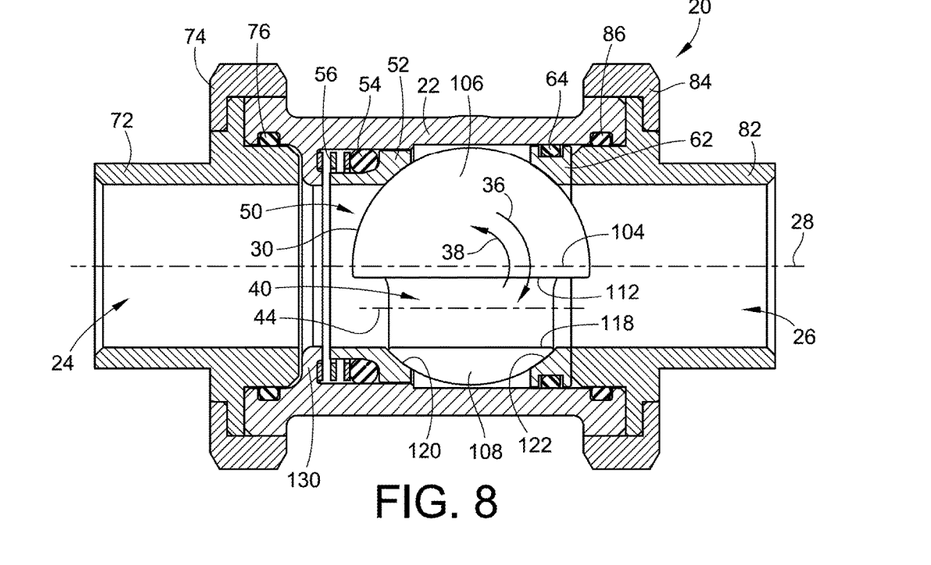
FIG. 8 is a top cross section taken along section line B-B of FIG. 1 illustrating the valve member of FIGS. 3 and 4 positioned within a housing of the ball valve of FIG. 1, with the valve member positioned such that the ball valve is in a fully opened position.

Turning now to FIGS. 5-8, the valve member 30 is shown in cross section positioned within the remainder of the ball valve 20 in both the fully closed position (see FIGS. 5 and 6) and the fully opened position (see FIGS. 7 and 8). With particular reference to FIG. 5, the same illustrates a cross section of the ball valve 20 in the fully closed position taken along section line A-A at FIG. 1. When the valve member 30 is rotated to the fully closed position, the passageway 40, and more particularly the valve member flow axis 44 therethrough, is out of parallel with the flow path axis 28.

However, the valve member flow axis 44 is less than perpendicular to the flow path axis 28 in the fully closed position. As a result, less than 90° of rotation is required to transition the ball valve 20 between the fully closed position and the fully opened position. In the particular embodiment, less than or equal to about 45° is required to transition the ball valve between the fully closed position and the fully opened position. It will be recognized from the description herein that the amount of rotation required is dependent upon the shape and offset position of the passageway 40 through the valve member 30.

Also as illustrated in FIG. 5, the inlet seal ring 52 includes an annular inlet seal surface 120 which generally has a curvature equal to the curvature of the outer periphery of the valve member 30 such that a tight seal is achieved between these components. This seal is enhanced by way of the biasing element 56 which biases the inlet seal ring 52, and more particularly the annular inlet seal surface 120, into sealing engagement with the head portion 106 of the valve member 30. As shown, the annular inlet seal surface 120 does not contact the neck portion 108 when the ball valve 20 is in the fully closed position. As a result, the overall pressure exerted upon the valve member 30 by the inlet seal ring 52 is reduced allowing for a reduced amount of actuation force to rotate the valve member 30 when transitioning the ball valve 20 from the fully closed position to the practically opened or fully opened positions.

Similar to the inlet seal ring 52, the outlet seal ring 62 also includes an annular outlet seal surface 122. The annular outlet seal surface 122 generally has the same shape or profile as the outer periphery of the valve member 30. It will be recognized from analysis of FIG. 5 that the biasing force from biasing element 56 not only biases inlet seal ring 52 into engagement with the valve member 30 as described above, but also biases valve member 30 into sealing engagement with the annular outlet seal surface 122 of the outlet seal ring 62.

The inlet and outlet seal rings 52, 62, and there corresponding seals 54, 64 thus prevent fluid flow from circumventing the passageway 40 and flowing around the outer periphery of the valve member 30 between the inlet and the outlet, thereby preventing leakage through the ball valve 20 when the same is in the fully closed position. Put differently, the inlet and outlet seal rings 52, 62, and there corresponding seals 54, 64 restrict fluid flow through the passageway 40 of the valve member 30. However, when the passageway 40 and more particularly the valve member flow axis 44 therethrough is out of parallel with the flow path axis 28, fluid cannot flow through the passageway 40 from the inlet to the outlet.

Turning now to FIG. 6, a cross section of the ball valve 20 in the fully closed position taken along section line B-B of FIG. 1 is illustrated. As shown, the valve member 30 is rotated such that the ball valve 20 is in the fully closed position. When this is so, the hemispherical head portion 106 contacts both annular inlet seal surface 120 and the annular outlet seal surface 122. However, the neck portion 108 only contacts the annular outlet seal surface 122. Also as shown, the valve member center axis 104 and valve member flow axis 44 are generally transverse to the flow path axis 28. In the particular embodiment, these axes are less than or equal to about 45° relative to the flow path axis 28.

Turning now to FIG. 7 a cross section of the ball valve 20 in the fully opened position taken along section line A-A of FIG. 1 is illustrated. Once the valve member 30 is rotated so as to place the ball valve 20 in the partially opened or fully opened position, fluid may then flow along the flow path axis 28 and through the passageway 40. Indeed, the valve member 30 is rotated so as to place the ball valve 20 in the fully opened position at FIG. 7. When this is so, the annular inlet seal surface 120 and annular outlet seal surface 122 contact both the hemispherical head portion 106 and neck portion 108 of valve member 30 (see FIG. 5). In such a configuration, the valve member flow axis 44 is parallel to the flow path axis 28.

Turning now to FIG. 8, a cross section of the ball valve 20 in the fully opened position taken along section line B-B of FIG. 1 is illustrated. In this configuration, the valve member center axis 104 is coincident and parallel with the flow path axis 28. The valve member flow axis 44 is parallel to each of the valve member center axis 104 and the flow path axis 28. As indicated above, to place the valve member 30 in this configuration, less than or equal to about forty-five degrees of rotation of the valve member 30 is required. Additionally, in this configuration, the annular inlet seal surface 120 contacts each of the hemispherical head portion 106 and the ring-shaped neck portion 108. The annular outlet seal surface 122 also contacts each of the hemispherical head portion 106 and the ring-shaped neck portion 108.

FIGS. 9-12, illustrate an alternative embodiment of a valve member 230 will be described. The remaining structure of the ball valve 20 remains unchanged when incorporating this valve member 230, and as such, the valve member 230 will be described in the context of the remainder of the ball valve 20 described above. This embodiment of a valve member 230 achieves the same or similar advantages as the valve member 30 described above, without utilizing an offset valve member flow axis.

Figure 9:
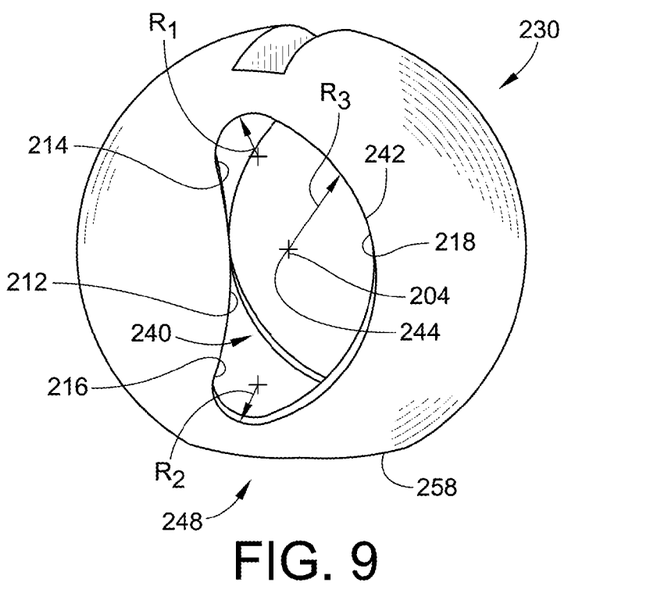
FIG. 9 is a front view of an alternative embodiment of a valve member of the ball valve of FIG. 1.
Figure 10:
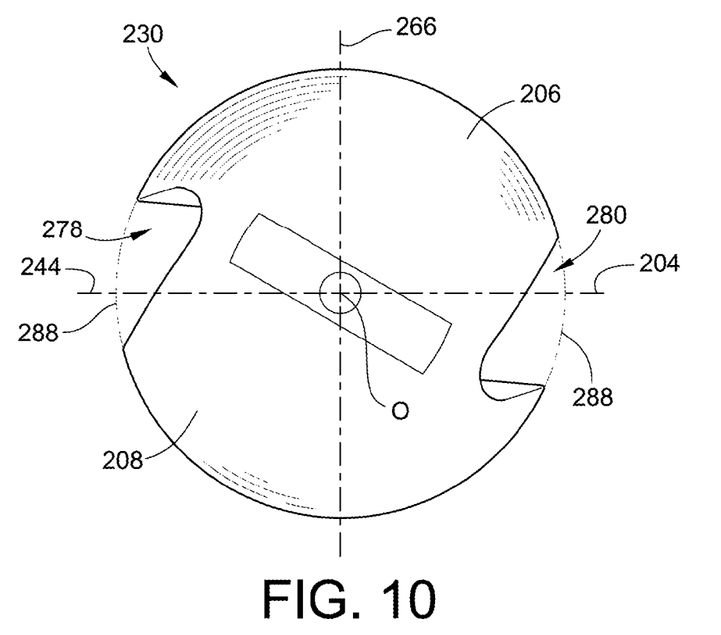
FIG. 10 is a top view of the valve member of FIG. 9.

Turning now to FIGS. 9 and 10, the particular shape of the illustrated embodiment of the valve member 230 will be described in greater detail. With particular reference to FIG. 9, the valve member 230 is shown such that a valve member flow axis 244 and valve member center axis 204 extend generally perpendicular to and out of the page. As can be seen in FIG. 9, the passage way 240 and more particularly the valve member flow axis 244 passing through the geometrical centroid of the passageway 240 is parallel to and coincident with the valve member axis 204 which passes through the center of the valve member 230. The passageway 240 is generally straight through the valve member 230 such that it is free from any substantial interruptions or substantial bends.

The shape of the orifices 242 at the terminal ends of the passageway 240 are generally similar to those described above relative to valve member 30.

More specifically, each orifice 242 includes a convex portion 212. A first concave portion 214 having a radius of curvature $R_1$ extends from an edge of the convex portion 212. Likewise, a second concave portion 216 extends from the other edge of the convex portion 212 and has a second radius of curvature $R_2$. As can be seen at FIG. 9, the first and second radii of curvature $R_1$, $R_2$ are the same.

A third concave portion 218 extends between the edges of the first and second concave portions 214, 216 that do not meet with and extend from the first convex portion 212. The third concave portion 218 has a radius of curvature $R_3$. As can be seen at FIG. 9, the third radius of curvature $R_3$ is greater than the first and second radii of curvature $R_1$, $R_2$. It will be recognized from inspection of FIG. 9 that the cross-sectional profile of the passageway 240 is not constant given that the position of the outlet side orifice 242 is rotated 180° relative to the inlet side orifice 242.

The valve member 230 also has a flat bottom 248 formed by an opening 258 (see also FIGS. 11 and 12) that extends into the valve member 230 and perpendicular to the valve member flow axis 244. The opening 258 is used for fixturing the valve member 230 during manufacture so as to ensure that the passageway extending from the inlet side orifice 242 will line up with the passageway extending from the outlet side orifice 242 during machining. More specifically, because these orifices 242 are rotated 180° relative to one another as described above, two separate machining operations are required, one to machine the inlet side orifice 242 and the other to machine the outlet side orifice 242.

With reference now to FIG. 10, the valve member 230 is shown in a top view. As can be seen in FIG. 10, the valve member 230 has a non-spherical shape. More particularly, the valve member 230 has a first partially hemispherical portion 206 and a second partially hemispherical portion 208. The first partially hemispherical portion 206 is positioned above the valve member center axis 204 as oriented in FIG. 10. The second partially hemispherical portion 208 is positioned below the valve member center axis 204 as oriented in FIG. 10. An inlet side pocket 278 extends into both the first and second partially hemispherical portions 206, 208. However, the inlet side pocket 278 forming the orifice 242 on the inlet side of the valve member 230 extends more radially inward into the first partially hemispherical portion 206 than the second partially hemispherical portion 208.

An outlet side pocket 280 which forms the orifice 242 on the outlet side of the valve member 230 also extends into the first and second partially hemispherical portions 206, 208. The outlet side pocket 280 extends more radially inward into the second partially hemispherical portion 208 than the first partially hemispherical portion 206. This arrangement of the pockets 278, 280 can also be described with reference to a vertical axis 266 that is perpendicular to the valve member axis 204 and extends through the geometrical center of the diameter 288 of the valve member 230. More specifically, the pockets 278, 280 are symmetric about an origin O formed at the intersection of the vertical axis 266 and the valve member center axis 204. It will be recognized from the foregoing description that the valve member 230 thus has a non-spherical shape.

Figure 11:
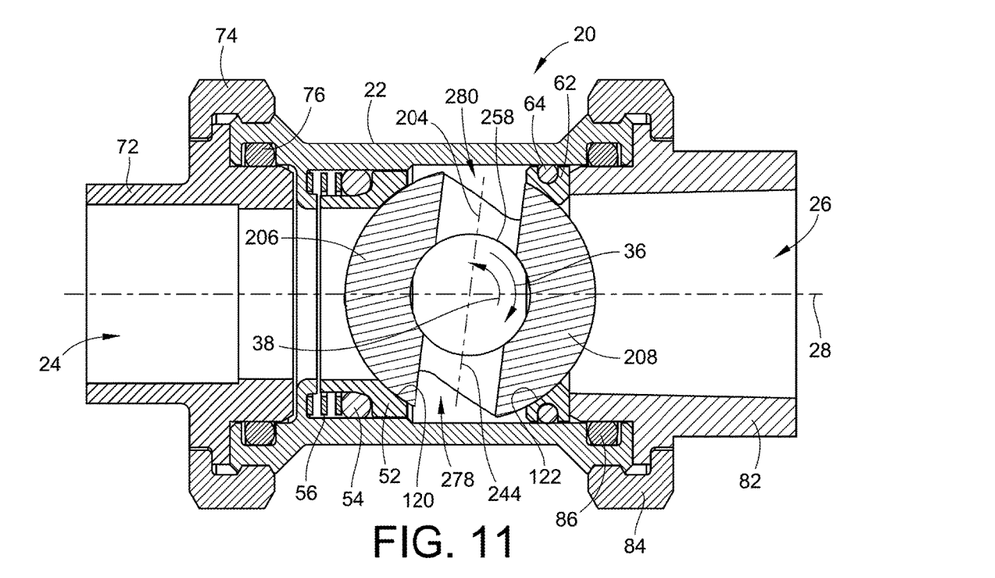
FIG. 11 is a top cross section taken along line B-B of FIG. 1 illustrating the valve member of FIG. 9 positioned within the housing of the ball valve of FIG. 1, with the valve member positioned such that the ball valve is in a fully closed position.
Figure 12:
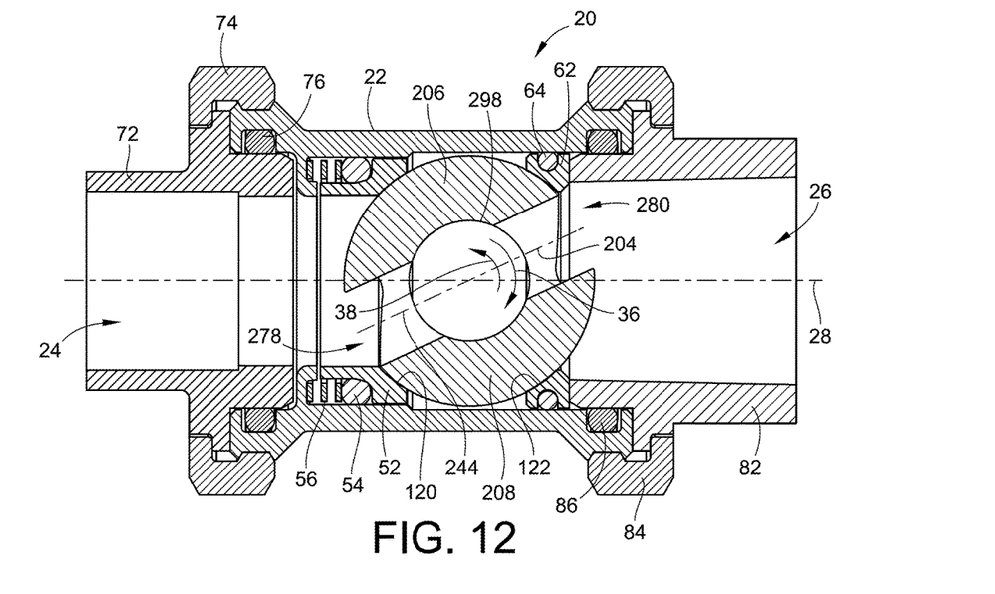
FIG. 12 is a top cross section taken along line B-B of FIG. 1 illustrating the valve member of FIG. 9 positioned within the housing of the ball valve of FIG. 1, with the valve member positioned such that the ball valve is in a fully opened position.

With reference now to FIGS. 11 and 12, a description will be provided of the structural arrangement of the valve member 230 relative to the remainder of the ball valve 20 in the fully closed and fully opened positions respectively. With particular reference to FIG. 11, the valve member 230 is rotated in the second rotational direction 38 so as to place the ball valve 20 in the fully closed position. When in the fully closed position, the first partially hemispherical portion 206 contacts the inlet seal surface 120. The first partially hemispherical portion 206, however, does not contact the outlet seal surface 122. The second partially hemispherical portion 208 is in sealing contact with the outlet seal surface 122. The second partially hemispherical portion 208, however, does not contact the inlet seal surface 120. As such, the inlet seal ring 52 sealing engages the first partially hemi-spherical portion 206, and the outlet seal ring 62 sealing engages the second partially hemispherical portion 208 in the fully closed position.

Turning now to FIG. 12, the valve member 230 has been rotated in the first rotational direction 36 so as to place the ball valve 20 in the fully opened position. Such rotation is less than or equal to about 45° in the first rotational direction. Likewise, to place the ball valve 20 back into the fully closed position, a rotation in the second rotational direction 38 of less than or equal to about 45° is required. This reduced amount of rotation achieves the same or similar advantages as that described above relative to a decrease in the amount of actuation torque required to transition the ball valve 20 between the frilly opened position and the fully closed position and vice versa.

When in the fully opened position, the hemispherical portion 206 contacts each of inlet and outlet seal surface 120, 122 such that the first partially hemispherical portion 206 sealing engages the inlet seal ring 52 and the outlet seal ring 62. Similarly, the second partially hemispherical portion 208 contacts both the inlet and outlet seal surfaces 120, 122 such that the second partially hemispherical portion 208 sealingly engages the inlet seal ring 52 and the outlet seal ring 62 in the fully opened position. As a result, fluid is restricted to flowing along the valve member flow axis 244 between the inlet and the outlet 24, 26 as the fluid moves through the ball valve 20.

The following describes methods of assembly, configuration, and operation of the ball valve 20 incorporating valve member 30. However, it will be recognized that the same steps described below could equally be employed using valve member 230. To assemble the ball valve 20, the biasing element 56 is placed within the internal cavity 50 of the housing 22 by inserting the same from the outlet 26 of the housing 22 until it abuts a shoulder 130 formed within the housing 22. The seal 52 is then positioned over the inlet seal ring 54 and thereafter slid from the outlet 26 into the internal cavity of the housing 22.

The valve stem 30 and its associated seals 96, 98 are then inserted through the outlet 26 of the housing 22 into the internal cavity 50 thereof and upwardly through port 90. The stem 32 is then rotated such that the longitudinal axis of the key 92 is parallel to the flow path axis 28. Thereafter, the valve member 30 is inserted into the internal cavity 50 of the housing 22 from the inlet 26 with the keyway 94 oriented to receive the key 92 of the stem 32.

Once the valve member 30 is mated with the valve stem 32 and positioned within the internal cavity 50, the outlet seal ring 62 and seal 64 are positioned on the outlet side of the valve member 30 within the internal cavity 50. Thereafter, the seal 86 is inserted into the internal cavity 50 and the outlet end fitting 82 is fastened to the housing 22 using hex nut 84. Finally, the seal 76 on the inlet side of the valve member 30 is inserted into the internal cavity 50, and the inlet end fitting 72 is fastened to the housing 22 using hex nut 74. It will be recognized that the assembly of the seal 76, inlet end fitting 72, and hex nut 74 can be done at any stage of the aforementioned assembly process.

To configure the ball valve 20 for operation, the inlet and outlet end fitting 72, 82 are affixed to appropriate piping. An actuator is mounted to the mounting structure 46 as well as the valve stem 32. The actuator is connected to a power supply and/or a controller and the ball valve 20 is placed into operation once any associated electronic initialization steps are completed. Alternatively, as indicated above, a hand manipulated device can be connected to the stem 32 for hand manipulation of the ball valve 20.

To operate the ball valve 20, the valve stem 32 is rotated in one of the first and second rotational directions 36, 38 of FIG. 1 to transition the ball valve 20 from the fully closed position to either the partially open position or the fully open position. This rotation is less than or equal to about 45°. Such a configuration advantageously reduces the power required to transition the ball valve 20 between the aforementioned positions. As a result, the ball valve 20 overcomes existing problems in the art by presenting a lightweight low power consumption package that can be readily integrated with existing fluid routing systems.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A ball valve having a fully open position to allow fluid flow through the ball valve, and a fully closed position to prevent fluid flow through the ball valve, the ball valve comprising:
   a housing having an inlet and an outlet and an internal cavity positioned between the inlet and the outlet, wherein a flow path extends through the housing and between the inlet and the outlet;
   a non-spherical ball valve member positioned within the internal cavity and within the flow path, the non-spherical valve member having a passageway therethrough that is selectively alignable with the flow path, the non-spherical valve member rotatable within the internal cavity to transition the ball valve between the fully open position and the fully closed position and vice versa;
   wherein the non-spherical valve member has a head portion and a ring-shaped neck portion extending outwardly from the head portion, with the passageway of the non-spherical valve member defining a valve member flow axis passing through the center of the passageway, and wherein the valve member flow axis passes only through the ring portion of the non-spherical valve member; and
   wherein a rotation of the non-spherical valve member of less than or equal to forty-five degrees transitions the ball valve between the fully opened position and the fully closed position and vice versa.

2. The ball valve of claim 1, wherein the head portion has a first width, and the ring-shaped neck portion has a second width, the first width greater than the second width.

3. A ball valve having a fully open position to allow fluid flow through the ball valve, and a fully closed position to prevent fluid flow through the ball valve, the ball valve comprising:
   a housing having an inlet and an outlet and an internal cavity positioned between the inlet and the outlet, wherein a flow path extends through the housing and between the inlet and the outlet;
   a non-spherical ball valve member positioned within the internal cavity and within the flow path, the non-spherical valve member having a passageway therethrough that is selectively alignable with the flow path, the non-spherical valve member rotatable within the internal cavity to transition the ball valve between the fully open position and the fully closed position and vice versa;
   wherein the non-spherical valve member has a head portion and a ring-shaped neck portion extending outwardly from the head portion, with the passageway of the non-spherical valve member defining a valve member flow axis passing through the center of the passageway, and wherein the valve member flow axis passes only through the ring portion of the non-spherical valve member; and
   further comprising an inlet seal positioned adjacent the inlet and having an annular inlet seal surface that sealingly engages the non-spherical valve member and an outlet seal positioned adjacent the outlet and having an annular outlet seal surface that sealing engages the non-spherical valve member, wherein the head portion contacts the annular inlet sealing surface and the annular outlet sealing surface in the fully closed position, and wherein the ring-shaped neck portion does not contact the annular inlet sealing surface in the fully closed position.

4. A ball valve having a fully open position to allow fluid flow through the ball valve, and a fully closed position to prevent fluid flow through the ball valve, the ball valve comprising:
   a housing having an inlet and an outlet and a flow path extending therebetween;
   a ball valve member positioned within an internal cavity of the housing between the inlet and the outlet and within the flow path to selectively transition the ball valve between the fully open and fully closed positions;
   wherein the passageway has a non-circular cross sectional profile and defines a valve member flow axis passing through a center of the passageway; and further comprising a valve stem extending from an exterior of the housing and into an internal cavity thereof, the valve stem mechanically coupled to the ball valve member such that rotation of the valve stem about a valve stem axis passing through a center of the valve stem results in a like rotation of the ball valve member, and wherein the ball valve transitions from the fully open position to the fully closed position and vice versa upon rotation of the valve stem and corresponding rotation of the ball valve member of less than or equal to forty-five degrees.

5. The ball valve of claim 4, wherein the valve member flow axis is offset from and parallel to a valve member center axis passing through a center of the ball valve member.

6. The ball valve of claim 4, wherein the passageway has a convex portion and at least one concave portion.

7. The ball valve of claim 6, wherein the passageway has a convex portion and first and second concave portions, the first concave portion beginning at a first edge of the convex portion, the second concave portion beginning at a second edge of the convex portion, each of the first and second concave portions having a free edge, with a third concave portion extending between the free edges of the first and second concave portions.

8. The ball valve of claim 7, wherein a radius of curvature of each of the first and second concave portions is less than a radius of curvature of the third concave portion.

9. A ball valve having a fully open position to allow fluid flow through the ball valve, and a fully closed position to prevent fluid flow through the ball valve, the ball valve comprising:

a housing having an inlet and an outlet and an internal cavity positioned between the inlet and the outlet, wherein a flow path extends through the housing and between the inlet and the outlet;

a valve member positioned within the internal cavity and rotatable therein such that rotation of the valve member of less than or equal to forty-five degrees transitions the ball valve from the fully open position to the fully closed position and vice versa wherein the valve member includes a head portion and a ring-shaped neck portion extending away from the head portion wherein the valve member includes a passageway extending through the ring-shaped neck portion; and wherein the passageway defines a valve member flow axis, and the valve member has a center axis passing through a center thereof, the valve member flow axis parallel to and offset from the valve member center axis.

* * * * *